United States Patent Office 3,074,383
Patented Jan. 22, 1963

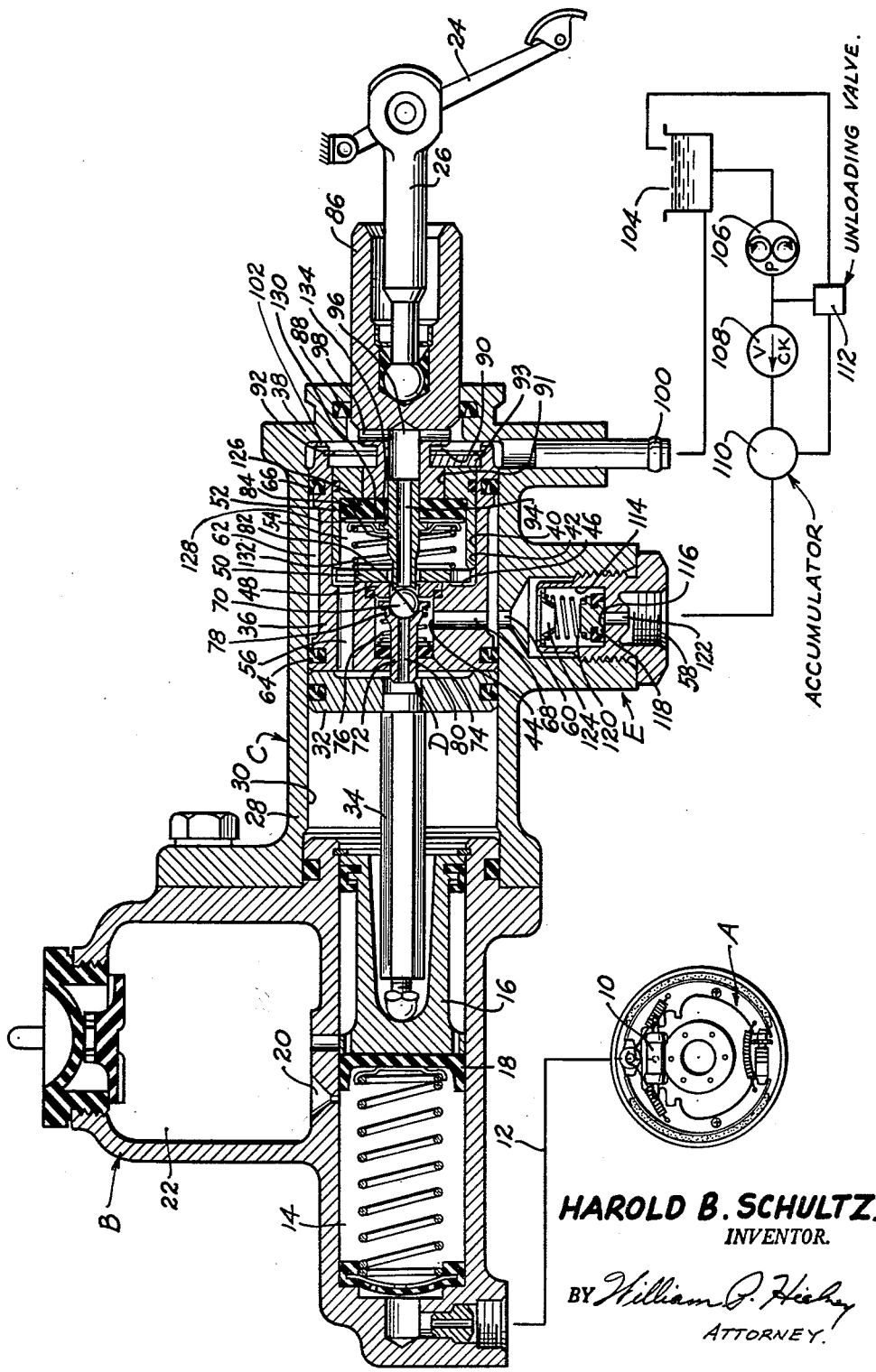

3,074,383
FULL POWER HYDRAULIC SERVOMOTOR
Harold B. Schultz, South Bend, Ind., assignor to The Bendix Corporation, South Bend, Ind., a corporation of Delaware
Filed Sept. 1, 1961, Ser. No. 135,489
1 Claim. (Cl. 121—38)

The present invention relates to a new and improved power braking system and more particularly to an improved hydraulic pressure operated servomotor of the type in which there normally is no follow-up of the driven member by the manually actuated control member until power failure, at which time the driven member is mechanically actuated by the control member.

In some types of fluid pressure motors which have been developed to actuate the brakes of an automotive vehicle, the unit's control valve structure has been mounted in a movable wall that is caused to remain stationary by the control valve's discharge pressure. With this arrangement, no follow-up of the unit's driven structure is accomplished so long as pressure fluid is supplied to the unit's control valve. On a failure of fluid pressure to the unit's control valve, the same units have been arranged so that the movable wall containing the control valve moves into abutment with the pressure actuated movable wall of the unit to thereafter operate the driven structure mechanically.

It sometimes occurs that the failure of fluid pressure to the control valve structure is only a partial one so that some power actuation and movement of the pressure driven movable wall can be accomplished before the force which is manually exerted on the control valve structure exceeds the force produced by the pressure fluid on the movable wall containing the control valve structure. One of the difficulties of these units has been that thereafter the movable wall containing the control valve must be moved manually into engagement with the pressure driven movable wall before manual force can be used to increase the force which is applied to the driven structure. With this movement of the movable wall containing the control valve structure during a partial power failure, a manual movement of the control element occurs for which there is no resulting increase in the output force of the servomotor.

An object of the present invention is the provision of a fluid pressure servomotor of the above described type wherein there is no lost motion of the unit's manually actuated structure after the time that the manually applied force exceeds the reaction thereon produced by the fluid pressure then available to operate the servomotor.

A further object of the present invention is the provision of a new and improved power operated braking system in which there is an absolute minimum of control lever movement both during the time that fluid pressure is available to operate the servomotor, and during the time that the driven structure must be operated manually.

The invention resides in certain constructions and combinations and arrangements of parts; and further objects and advantages of the invention will become apparent to those skilled in the art to which it relates from the following description of the preferred embodiment described with reference to the accompanying drawing forming a part of the specification, and in which:

The solitary FIGURE of the drawing is a somewhat schematic view of an automotive braking system employing a hydraulic fluid pressure servomotor embodying principles of the present invention to operate the usual master cylinder of the automotive braking system.

The braking system shown in the drawing generally comprises the usual drum brake structures A, only one of which is shown, having a wheel cylinder 10 which is supplied with hydraulic pressure from a conventional master cylinder B through the hydraulic lines 12. The master cylinder B includes a fluid pressurizing chamber 14 from which fluid is displaced by means of the conventional hydraulic piston 16 into the hydraulic lines 12 leading to the wheel cylinders 10. The piston 16 is equipped with the usual cup seal 18 which, in its normal retracted position, lies rearwardly of the compensating port 20 which is used to communicate fluid from its reservoir 22 to the fluid pressurizing chamber 14. Upon actuation of the piston 16, the cup seal 18 slides past the compensating port 20 to isolate fluid within the pressurizing chamber and force it out through the hydraulic lines 12. The braking system shown in the drawing further includes a hydraulic pressure operated fluid pressure servomotor C which is controlled by means of the usual foot pedal lever 24 through the interconnecting control rod 26.

The servomotor C shown in the drawing is of the type in which there is no follow-up i.e. no movement of the control rod 26 other than that necessary to operate the unit's control valve when power is available to actuate the servomotor. The servomotor C shown is formed by means of a cast housing 28 that is suitably bolted to the rear end of the master cylinder B and includes a longitudinally extending cylinder bore 30 which slidably receives the hydraulic piston 32 which drives the hydraulic piston 16 of the master cylinder through the push rod 34. As previously indicated, the servomotor C is of the full power type, and in order that this may be accomplished, the control valve structure D is mounted in another hydraulic piston 36 positioned rearwardly of the piston 32 in the bore 30. Hydraulic piston 36 is normally held in engagement with the rear end wall 38 of the housing 28 by means of the discharge pressure from the control valve structure D which operates the driven piston 32.

The control valve structure D is generally positioned within the stepped bore 40 within the hydraulic piston 36. Stepped bore 40 has a larger diameter portion 42 opening rearwardly of the piston 36 and a small diameter pressure portion 44 which extends through the forward end of the piston 36 and which is separated from the large portion 42 by means of a shoulder 46. The sidewalls of the small diameter bore 44 are bored out slightly adjacent the shoulder 46 to receive an annular high pressure valve seat member 48 that is provided with a suitable seal, and which is held in place by means of a washer 50 that is held against the valve seat member 48 and the shoulder 46 by means of a cup shaped end closure member 52 in the rear end of the large diameter bore section 42. The portion within the shaped member 52 forms the control chamber 54 of the valve whose pressure is communicated with the space between the pistons 32 and 36 by means of suitable openings through the washer 50, and the control passage 56 which extends through the rear hydraulic piston 36.

Motivating hydraulic pressure fluid is supplied to the pressure inlet connection 58 in a manner later to be explained, and passes through a suitable check valve structure, also later to be explained, to a pressure port 60 in the side walls of the longitudinally extending bore 30. Pressure from the pressure port 60 is continually communicated to the small diameter bore section 44 by means of a reduced diameter center section 62 of the piston 36 which lies between end seals 64 and 66 which effect a sliding seal with respect to the bore 30. Pressure from the annular area provided by the reduced diameter section 62 is communicated to the bore section 44 through a transverse passageway in the piston 36.

Flow out through the high pressure valve seat member 48 is controlled by means of a ball valve 70. The ball valve 70 is pressed into the enlarged headed end of a tubular supporting member 72 which extends out through the front end of the piston 36 and which is sealed with respect to the sidewalls of the small diameter bore section 44 by a suitable seal 74. A suitable coil spring 76 biases the tubular member against the ball 70, and the external diameter of the tubular support member 72 is caused to be of the same diameter as is the surface on the valve seat member 48 on which the ball 70 abuts. The central opening 80 through the tubular member 72 assures that control pressure from the passage 56 will at all times exist on the left side of the ball as seen in the drawing.

Actuation of the control valve D is had by means of a tubular member 84 which extends through the opening in the high pressure valve seat member 48 to lift the ball 70 out of engagement with the high pressure seat. Tubular valve actuating member 84 is supported by the front end of the control member 86 to which the front ball end of the control rod 26 is suitably secured. A suitable seal 88 is provided between the external surface of the control member 86 and a receiving opening through the rear end wall 38 of the housing 28; and the reduced diameter front end section 90 of the control member 86 is slidably received in a suitable opening 91 in cup-shaped closure member 52. Withdrawal of the control member 86 rearwardly out of the unit is prevented by means of a horseshoe washer 93 which is slipped sideways into a groove 90 in the control member 86, and which horseshoe washer is held within the bore 40 by means of a suitable snap ring 92. Sufficient axial play is provided by groove 90 to permit the tubular member 84 to be moved a sufficient amount to abut the ball 70 and move it out of engagement with its valve seat member 48. The groove 90 is so positioned that the tubular member 84 is out of engagement with the ball 70 when its front edge abuts the horseshoe stop member 93—in which position control chamber 54 is communicated through the central opening 94 of the tubular member to axial and transverse drillings 96 and 98 in the control member 86 to communicate the fluid with its exhaust connection 100 in the rear end of the bore 30. Several grooves 102 in the rear end of the piston 36 assure continual flow around the rear end of the piston 36.

Flow out through the exhaust connection 100 is normally communicated to a sump or reservoir 104 from whence it flows to a high pressure hydraulic pump 106 through a check valve structure 108 to an accumulator 110 which maintains a supply of high pressure fluid under a suitable compressed gas chamber, even when the pump 106 is not pumping. A suitable charging valve 112 is used to unload the pump 106 whenever the pressure in the accumulator 110 exceeds a predetermined upper limit, and causes the pump 106 to charge the accumulator whenever pressure in the accumulator 110 drops below a predetermined limit. Pressure from the accumulator 110 is continually supplied to the pressure inlet connection 58 from whence it flows to the pressure chamber 44 through the check valve structure E.

The check valve structure E may be of any suitable type, and as shown in the drawing is formed within the fitting 58 by means of a counterbore 114 in the inner end of the fitting 58. The bottom of the counterbore 114 provides a suitable valve seat 116 against which a poppet member 118 is biased by a coil spring 120 to prevent return flow out through the central opening 122 in the center of the counterbore 114. The spring 120 is held in place by means of a suitable annular flared spring retainer 124 which is fitted into the inner end of the counterbore 114 and is held in place by flaring over the sidewalls of the connector 58.

In the normal de-energized condition of the system shown in the drawing, wherein the front edge of the groove 90 in the control member 86 abuts the horseshoe washer 93, the inner end of the tubular member 84 is out of engagement with the ball 70 so that hydraulic fluid under substantially atmospheric pressure exists in the control chamber 54, as well as the space between the pistons 32 and 36. When the pedal 24 is depressed, tubular member 84 is moved inwardly to abut the ball 70 to thereby isolate the control chamber 54 from the low pressure reservoir 114. Continued inward movement thereafter lifts the ball 70 off of the high pressure valve seat member 48 to permit pressure from the accumulator 110 to be communicated to the control chamber 54, and to the space between the pistons 32 and 36. As pressure fluid is communicated to the space between the pistons, the front piston 32 is forced forwardly to slide the hydraulic piston 16 of the master cylinder forwardly past its compensating port and thereby actuate the brakes of the vehicle. Fluid pressure that is communicated against the front piston 32 is also communicated to the front surface of the rear piston 36 to bias it rearwardly and hold it in firm engagement with the rear wall 38 of the servomotor. The only movement that takes place therefore of the control member 86 is that required to lift the ball 70 out of engagement with its valve seat.

The valve structure shown is also provided with a reaction producing mechanism for forcing the control member 86 rearwardly with a force which is less than the force applied to the piston 32 but which is otherwise proportional to the same. This is accomplished by means of an annular block of elastomeric pressurizable material such as rubber 126 which surrounds the tubular portion 94 to form a seal between the same and the bottom of the inside walls of the cup shaped members 52 to suitably seal off the rear end of the control chamber 54. The block of rubber 126 is held in place by means of a washer 128, spring retainer 130 and coil spring 132. The front end of the control member 86 is suitably rounded and positioned so that it will abut the rubber washer 126 when its forward end abuts the ball 70. Thereafter pressure which is produced within the control chamber 54 forces the rubber gradually against the end of the control member 86 until the whole end of the control member 86 is abutted by the rubber. Thereafter, control member 86 is biased rearwardly by the internal pressure of the rubber which will generally correspond to the hydraulic pressure which exists in the control chamber 54. A suitable flange 134 on the control member 84 between the spring retainer 130 and washer 128 holds the washer 128 against the rubber at all times. When it is desired to prevent further increase in braking effort, constant force is maintained against the pedal 24 which permits sufficient pressure to build up past the ball 70 into the control chamber 54 to produce a reaction force on the control member 86 which equals and offsets the applying pressure on the pedal lever 24.

A reduction in braking effort is accomplished by removing some force from the lever 24 whereupon the internal pressure of the rubber disc 126 causes the control member 86 to move rearwardly to lift the inner end of the tubular member 84 out of engagement with the ball 70 thereby permitting pressure to be bled out of the control chamber 54 through the passages 94, 96 and 98 to the exhaust connection 100. This continues until the reduction in pressure in the control chamber 54 has proceeded to a point where the force on the pedal lever 24 causes the tubular member 84 to again abut the ball 70, and thereby prevent further flow of pressure fluid out of the control chamber 54. A complete removal of force from the pedal lever 24 permits the rubber block 126 to move the tubular control member 84 into the position shown in the drawing, wherein all pressure is removed from the control chamber 54.

Inasmuch as the control valve D is housed within the movable piston structure 36, the force applied upon the control member 86 from the foot pedal lever 24 will move the piston 36 forwardly whenever the force that is applied by the foot pedal lever 24 is greater than the reverse force applied by hydraulic pressure between the pistons 36 and 32. Were the check valve E structure not included, and were a partial power failure to occur, pressure would be bled into the space between the pistons 32 and 36 until no further build-up in pressure could take place from the accumulator 110—whereupon the manual force applied to the piston 36 would cause the piston 36 to move forwardly and displace the fluid out through the connection 58 to the reservoir 110, until such time as the piston 36 abutted the driven piston 32. This would result in a considerable foot pedal lever movement during which time no movement of the driven piston 32 would take place. Thereafter, of course, the piston 36 would physically abut the piston 32 so that manual force would be transmitted from the rear shoulder of the groove 90 onto the horseshoe washer 93 to the piston 36 and hence to the driven piston 32.

By reason of the check valve structure E, however, no pedal movement takes place during a depletion of pressure in the accumulator 110. Force applied to the foot pedal lever 24 causes pressure to flow to the space between the pistons 32 and 36 up until such time as the pressure which the accumulator 110 then holds is communicated to the space between the pistons 32 and 36. During this initial period, the foot pedal lever 24 remains substantially stationary, since sufficient hydraulic pressure exists to hold the piston 36 against the rear wall 38 of the servomotor, against the force being applied by the foot pedal lever 24. Thereafter an increase in force on the foot pedal lever 24 no longer produces any increase in hydraulic pressure between the pistons 32 and 36 so that the piston 36 moves forwardly in the bore 30. By reason of the check valve structure E, return flow to the accumulator 110 is prevented so that fluid between the pistons 32 and 36 is held trapped or locked therebetween; and so that the driven piston 32 will move forwardly in the bore 30 at the same rate as does the piston 36. By reason of the check valve structure E therefore, no lost motion occurs during manual operation of the foot pedal lever 24 during a partial power failure; and the driven piston 32 need not be mechanically abutted by the piston 36 except under a condition where no pressure is being held in the accumulator 110.

It will be apparent that the objects heretofore enumerated as well as others have been accomplished; and that there has been provided a hydraulic fluid pressure servomotor which is operated by a minimum of manual control movement; and which, during a partial failure of actuating pressure, produces a direct movement of the driven structure without a change in position between the manually actuated and driven structures.

While the invention has been described in considerable detail, I do not wish to be limited to the particular embodiment shown and described, and it is my intention to cover hereby all novel adaptations, modifications, and arrangements thereof which come within the practice of those skilled in the art to which the invention relates.

I claim:

In power brake control apparatus and the like which must be operated manually during power failure: a housing having a forwardly and rearwardly extending fluid displacement chamber therein that is closed off by a rear end wall; a piston slidably received in said chamber, said piston having front and rear spaced apart seals which engage the sidewalls of said chamber and which define a pressure chamber between said sidewalls and piston which is movable forwardly along said displacement chamber, said piston having a normal position adjacent said rear end wall, said piston having front and rear internal piston chambers separated by a valve seat member having a valve port therethrough, a valve closure member positioned in said front piston chamber and normally biased for sealing engagement with said valve seat member surrounding said port; a valve actuating member having a tubular portion which projects forwardly through said rear piston chamber and valve port for sealing engagement with said valve closure member, said tubular portion having an internal flow passage which communicates with regions of low pressure, the portion of said fluid pressure chamber rearwardly of said piston communicating with regions of low pressure, said piston having a pressure supply passage communicating said movable pressure chamber and said front piston chamber and a control passage communicating said rear piston chamber with said fluid displacement chamber forwardly of said piston, said housing having a pressure supply passage which communicates with said movable pressure chamber, a check valve preventing flow out of said front piston chamber through said pressure supply passages, and abutment means constructed and arranged to transfer forward motion of said valve actuating member to said piston when said tubular portion has abutted said valve closure member and has lifted it off of said valve seat member, and whereby simple valve means is provided which closes off both the supply and exhaust passages when said piston is moved manually by said control member.

References Cited in the file of this patent

UNITED STATES PATENTS

| | | |
|---|---|---|
| 1,761,268 | Maclennan | June 3, 1930 |
| 2,214,817 | Harrington | Sept. 17, 1940 |
| 2,407,097 | Porter | Sept. 3, 1946 |
| 2,544,042 | Pontius | Mar. 6, 1951 |
| 2,775,957 | Anderson | Jan. 1, 1957 |